United States Patent Office 3,261,749
Patented July 19, 1966

3,261,749
METHOD OF CURBING APPETITE
Ernst Seeger, Biberach an der Riss, Germany, assignor, by mesne assignments, to Boehringer Ingelheim G.m.b.H., Ingelheim (Rhine), Germany, a corporation of Germany
No Drawing. Filed Oct. 12, 1962, Ser. No. 230,262
10 Claims. (Cl. 167—55)

The invention relates to novel anorexogenic compositions comprising a compound selected from the group consisting of 1-(chlorophenyl)-2-pyrrolidino-alkanes having the formula

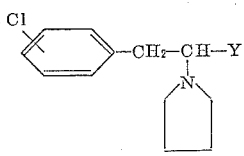

(I)

wherein Y is an alkyl radical having 1 to 4 carbon atoms and their pharmaceutically acceptable, non-toxic acid addition salts and a pharmaceutical carrier. The invention also relates to a novel method of curbing appetites.

Various compounds are known which are capable of curbing the appetite to cause weight losses but these compounds have various disadvantages such as requiring such high dosages to curb the appetite that undesirable side effects occur. Since the appetite curbing activity is very often connected with the central nervous system stimulating activity, unpleasant conditions of excitation occur if the appetite curbing activity and the central nervous system stimulating activity occur in the same dosage range. Also, there is sometimes the danger of causing a condition of euphoria. Therefore, the quotient of $$\frac{\text{central nervous system stimulating dose}}{\text{appetite curbing dose}}$$

should be as large as possible for effective appetite curbing compounds and they should not have an euphoric effect.

It is an object of the invention to provide novel compositions for curbing the appetite.

It is another object of the invention to provide a novel method of curbing the appetite.

These and other objects and advantages of the invention will become obvious from the following detailed description.

The novel appetite curbing compositions of the invention are comprised of a compound selected from the group consisting of 1-(chlorophenyl)-2-pyrrolidino-alkanes having the formula

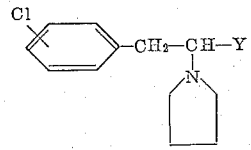

(I)

wherein Y is an alkyl radical having 1 to 4 carbon atoms and their pharmaceutically acceptable, non-toxic acid addition salts and a pharmaceutical carrier. The said compositions usually contain 0.1 to 25%, preferably 0.25 to 18%, by weight of the 1-(chlorophenyl)-2-pyrrolidino-alkane.

The novel compositions are preferably adapted for peroral use for convenience but may be used in other forms such as suppositories. The compositions are preferably in the form of tablets, coated pills, gelatin capsules, wafer capsules, drops, suspensions, etc. for peroral use.

Examples of suitable inert pharmaceutical carriers are sugar syrups, potato starch, talcum, polyethylene glycols, lactose and suppository bases such as cocoa butter or Witepsol H12. The compositions may also contain preservatives such as esters of p-hydroxy benzoic acid and flavorings.

Examples of suitable acids for forming the acid addition salts are hydrochloric acid, sulfuric acid, phosphoric acid, hydrobromic acid, methane sulfonic acid, tartaric acid, maleic acid, citric acid, phthalic acid, etc.

The novel method of the invention for curbing appetites comprises administering an effective amount of a compound selected from the group consisting of 1-(chlorophenyl)-2-pyrrolidino-alkanes having the formula

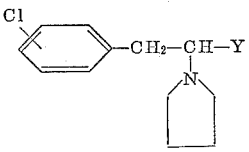

(I)

wherein Y is an alkyl radical having 1 to 4 carbon atoms and their pharmaceutically acceptable, non-toxic acid addition salts. The usual single dose is 10 to 50 mgm., preferably 25 mgm., of the said compounds and the usual daily dosage is 20 to 100 mgm., preferably 50 mgm., of the said compounds.

The 1-(chlorophenyl)-2-pyrrolidino-alkanes of Formula I can be prepared by reacting the desired α-pyrrolidino-alkyl nitrile with a Grignard reagent prepared from magnesium and a o-, m- or p-chlorobenzyl chloride in an inert organic solvent. The acid addition salts may be made in the usual known methods.

In the following examples there are described several preferred embodiments to illustrate the invention. However, it should be understood that the invention is not intended to be limited to the specific embodiments.

*Example I*

18.2 gm. (0.15 mol) of α-pyrrolidino-propionitrile dissolved in ethyl ether was added dropwise with stirring and cooling to a Grignard reagent prepared from 7.2 gm. (0.3 mol) of magnesium powder and 48.3 gm. (0.3 mol) of p-chlorobenzyl chloride in absolute ether. The reaction mixture was refluxed for two hours and then admixed with ice and dilute hydrochloric acid. The aqueous phase was recovered and made alkaline and an oil substance separated out which was extracted with ether. After distillation of the ether under vacuum, 28 gm. of 1-(p-chlorophenyl)-2-pyrrolidino-propane having a boiling point of 93–94° C. at 0.1 mm. Hg were obtained.

The hydrochloride and maleate salts were formed by adding an etheral solution of the desired acid to the product. Upon recrystallization from acetone, the hydrochloride salt of 1-(p-chlorophenyl)-2-pyrrolidino-propane had a melting point of 138° C. while the maleate salt of the said product had a melting point of 71° C.

Using the above procedure except that 48.3 mg. (0.3 mol) of m-chlorobenzyl chloride was used, 26 gm. of 1-(m-chlorophenyl)-2-pyrrolidino-propane having a boiling point of 91° C. at 0.1 mm. Hg were obtained. The hydrochloride salt upon recrystallization from acetone had a melting point of 168° C.

Using 48.3 gm. (0.3 mol) of o-chlorobenzyl chloride in the above procedure gave 28 gm. of 1-(o-chlorophenyl)-2-pyrrolidino-propane having a boiling point of 103–105° C. at 0.6 mm. Hg and whose hydrochloride salt had a melting point of 155° C. upon recrystallization from acetone.

*Example II*

Using the procedure of Example I, 22.8 gm. of α-pyrrolidino-valeronitrile were reacted with a Grignard reagent from 7.2 gm. of magnesium powder and 48.3 gm. of p-chlorobenzyl chloride in absolute ether to obtain 37 gm. of 1-(p-chlorophenyl)-2-pyrrolidino-pentane having a boiling point of 113° C. at 0.4 mm. Hg. Its hydrobromide salt had a melting point of 110° C. upon recrystallization from acetone.

*Example III*

By reacting the proper chlorobenzyl chloride and α-pyrrolidino-alkyl nitrile according to the procedure of Example I, the following compounds were prepared.

TABLE I

| Compound | Boiling Point of Free Base | Melting Point of Hydrochloride Salt, °C. |
| --- | --- | --- |
| 1-(p-chlorophenyl)-2-pyrrolidino-4-methyl-pentane. | 120–121° C. at 0.4 mm. Hg | 165–166 |
| 1-(p-chlorophenyl)-2-pyrrolidino-3-methyl-butane. | 115–116° C. at 0.4 mm. Hg | 195 |
| 1-(p-chlorophenyl)-2-pyrrolidino-hexane. | 130° C. at 0.5 mm. Hg | 114–116 |
| 1-(p-chlorophenyl)-2-pyrrolidino-butane. | 122° C. at 0.6 mm. Hg | 141 |
| 1-(o-chlorophenyl)-2-pyrrolidino-pentane. | 112° C. at 0.25 mm. Hg | |

PHARMACOLOGICAL COMPOSITIONS

*Composition I—Syrup.*—65 gm. of sugar were dissolved in about 35 ml. of distilled water with warming and the resulting syrup was cooled and filtered. 0.48 gm. of citric acid monohydrate, 0.01 gm. of red food dye No. 1, 0.52 gm. of sodium secondary phosphate dihydrate and 0.25 gm. of 1-(p-chlorophenyl)-2-pyrrolidino-propane hydrochloride were dissolved in about 30 ml. of distilled water and introduced into the sugar syrup with stirring. 0.07 gm. of methyl p-hydroxy benzoate and 0.03 gm. of propyl p-hydroxy benzoate dissolved in 3 gm. of pure ethanol were then stirred into the syrup. After stirring 0.4 gm. of raspberry flavoring into the syrup, the syrup was filtered. 10 cc. of the syrup contained 25 mgm. of 1-(p-chlorophenyl)-2-pyrrolidino-propane hydrochloride.

*Composition II—Capsules.*—200 mgm. of milled 1-(p-chlorophenyl)-2-pyrrolidino-propane hydrochloride were suspended in 900 mgm. of polyethylene glycol 400 with a homogenizer and the suspension was put into No. 2 gelatin capsules containing 110 gm. of the suspension per capsule by a Schere rotary die process.

*Composition III—Wafer capsules.*—200 mgm. of 1-(p-chlorophenyl)-2-pyrrolidino-propane hydrochloride were admixed with 4800 mgm. of lactose. After the mixture were passed through an 0.3 mm. mesh screen, the mixture was filled into wafer capsules containing 500 mgm. of the mixture.

*Compositive IV—Tablets.*—A starch mucilage was prepared from 0.1 gm. of potato starch and 2.0 gm. of distilled water and 0.1 gm. of polyethylene glycol 6000 was dissolved therein. A mixture of 2.5 gm. of 1-(p-chlorophenyl)-2-pyrrolidino-propane hydrochloride, 4.2 gm. of lactose, 4.1 gm. of potato starch, 0.9 gm. of talcum and 0.1 gm. of maleic acid was intensively kneaded with the starch mucilage and after passing the resulting mixture through a 0.1 mm. mesh screen to form a granulate, the granulate was dried at 40° C. The dried granulate was again passed through a 0.1 mm. mesh screen and then was pressed into 120 mgm. tablets having a diameter of 7 mm.

*Composition V—Coated pills.*—The tablets of composition IV were coated with a gel of sugar and talcum and were then polished with the aid of beeswax to form coated pills weighing 200 mgm. and containing 25 mgm. of 1-(p-chlorophenyl)-2-pyrrolidino-propane hydrochloride.

*Composition VI—Drops.*—1.5 gm. of 1-(p-chlorophenyl)-2-pyrrolidino-propane hydrochloride, 0.48 gm. of citric acid, 0.52 gm. of sodium secondary phosphate dihydrate, 0.2 gm. of sodium saccharin and 20 gm. of sugar were dissolved in about 60 cc. of distilled water. 0.07 gm. of methyl p-hydroxy benzoate and 0.03 gm. of propyl p-hydroxy benzoate were dissolved in 15 cc. of pure ethanol and 0.5 gm. of orange flavoring were added thereto. The ethanol solution was added to the aqueous solution with stirring and the resulting solution was diluted with water to 100 ml. and then filtered. 1 ml. of the solution contained 15 mgm. of 1-(p-chlorophenyl)-2-pyrrolidino-propane hydrochloride.

*Composition VII—Suppositories.*—165.0 gm. of a suppository base (Witepsol H12) was melted and heated to 35° C. and 5.0 gm. of finely divided 1-(p-chlorophenyl)-2-pyrrolidino-propane hydrochloride was homogenously distributed therein. The composition was cooled to 32° C. and poured into precooled molds to form suppositories weighing 1.7 gm.

PHARMACOLOGICAL DATA

A. *Appetitite curbing activity.*—Groups of 6 male rats of approximately the same body weight were fed a feed (Altromin-Stickfeed) and water as needed. During the tests, one group of rats served as a control and three groups of rats received the test substance. The rats were weighed and then the feed was removed for 24 hours while they had free access to water. At the end of the 24 hour period, the rats were weighed again and then given free access to feed and water. At the end of the 24 hour period the control rats received subcutaneously 0.5 cc. of a sodium chloride solution at three intervals of 2 hours each. The test animals at the same time intervals received 0.5 cc. of 1-(p-chlorophenyl)-2-pyrrolidino-propane hydrochloride in solution at various concentrations. At the end of six hours the rats and the untouched feed were weighed and the feed consumption per 100 g. of body weight was calculated which for the control group was about 2.0 g. per 100 gm. of body weight. At the end of 24 hours after the start of the test, the feed consumption and body weight were again determined. The animals were fed again after a rest period of one week. The results of the test are summarized in Table II.

TABLE II

| Subcutaneous dose, mg./kg.: | Percent average reduction of feed consumption |
| --- | --- |
| 2.5 | 28 |
| 5 | 46 |
| 10 | 64 |
| 20 | 77 |
| 40 | -- |

The $ED_{50}$, determined graphically from the above values, was 6.1 mgm./kg.

Using the same procedure as above, the appetite curbing activity of the following compounds was determined at a subcutaneous dose of 20 mgm./kg.

TABLE III

| Compound tested: | Percent average reduction of feed consumption |
| --- | --- |
| 1-(p-chlorophenyl)-2-pyrrolidino-pentane hydrochloride | 78.5 |
| 1-(p-chlorophenyl)-2-pyrrolidino-4-methyl-pentane hydrochloride | 49.3 |
| 1-(p-chlorophenyl)-2-pyrrolidino-butane hydrochloride | 64.4 |
| 1-(o-chlorophenyl)-2-pyrrolidino-pentane hydrochloride | 58.5 |

The $LD_{50}$ of 1-(p-chlorophenyl)-2-pyrrolidino-propane hydrochloride was determined to be 255 mg./kg. subcutaneously in mice. The $LD_{50}$ is therefore above 43 times greater than the $ED_{50}$.

B. *Central nervous system stimulating activity.*—The central nervous system stimulating activity of 1-(p-chlorophenyl)-2-pyrrolidino-propane hydrochloride was determined by measuring the mobility of rats in vibrating cages according to the method of Schlagint weit (Arch. Exp.

Path. and Pharm., vol. 131, 1928, p. 212). The method was modified in that the motoric excitation of the rats was registered by means of electrical contacts and the dose was given subcutaneously. The results are summarized in Table IV.

TABLE IV

| Dose—mg./kg.: | Average number of released contacts per hour |
|---|---|
| 0 | 65 |
| 10 | 276 |
| 20 | 417 |
| 30 | 308 |
| 100 | 710 |

The table shows that the test product does not have any central nervous system stimulation since the standard value of 5000 contacts per hour ($ED_{5000}$) was not obtained.

C. *Therapeutic quotient.*—The therapeutic quotient $$\left(\frac{ED_{5000}}{ED_{50}}\right)$$

of 1-(p-chlorophenyl)--2-pyrrolidino-propane hydrochloride is larger than 17.0

$$\left(\frac{\geq 100 \text{ mg./kg.}}{6, 1 \text{ mg./kg.}}\right)$$

and it is therefore larger than the therapeutic quotient of any known substance with appetite curbing activity.

Various modifications of the compositions of the invention may be made without departing from the spirit or scope thereof and it is to be understood that the invention is to be limited only as defined in the appended claims.

I claim:
1. The method of curbing appetites in animals which comprises administering by oral administration or rectal administration a compound selected from the group consisting of 1-(chlorophenyl)-2-pyrrolidino-alkanes having the formula

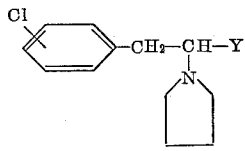

wherein Y is an alkyl radical having 1 to 4 carbon atoms and their pharmaceutically acceptable, non-toxic acid addition salts in an amount sufficient to curb the appetite of the animal.

2. The method of claim 1 wherein the compound to be administered is selected from the group consisting of 1-(p-chlorophenyl)-2-pyrrolidino-propane and its acid addition salts.

3. The method of claim 1 wherein the compound to be administered is selected from the group consisting of 1-(o-chlorophenyl)-2-pyrrolidino-pentane and its acid addition salts.

4. The method of claim 1 wherein the compound to be administered is selected from the group consisting of 1-(p-chlorophenyl)-2-pyrrolidino-butane and its acid addition salts.

5. The method of claim 1 wherein the compound to be administered is selected from the group consisting of 1- p-chlorophenyl)-2-pyrrolidino-hexane and its acid addition salts.

6. The method of claim 1 wherein the compound to be administered is selected from the group consisting of 1-(p-chlorophenyl)-2-pyrrolidino-3-methyl-butane and its acid addition salts.

7. The method of claim 1 wherein the compound to be administered is selected from the group consisting of 1-(p-chlorophenyl)-2-pyrrolidino-4-methyl - pentane and its acid addition salts.

8. The method of claim 1 wherein the compound to be administered is selected from the group consisting of 1-(p-chlorophenyl)-2-pyrrolidino-pentane and its acid addition salts.

9. A method of curbing appetites of animals which comprises daily administering by oral administration or rectal administration 20 to 100 mgm. of the hydrochloride of 1-(p-chlorophenyl)-2-pyrrolidino-propane to curb the appetite of the animal.

10. The method of claim 9 wherein the amount administered is 50 mgm.

References Cited by the Examiner

FOREIGN PATENTS 851,660  10/1960  Great Britain.

JULIAN S. LEVITT, *Primary Examiner.*

FRANK CACCIAPAGLIA, JR., *Examiner.*

SAM ROSEN, *Assistant Examiner.*